April 10, 1945.  F. H. MAGNUS  2,373,129
HARMONICA
Filed Dec. 3, 1942
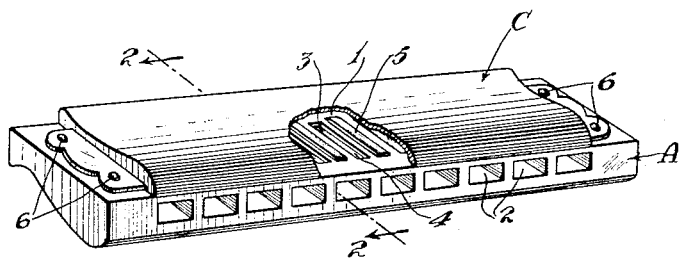
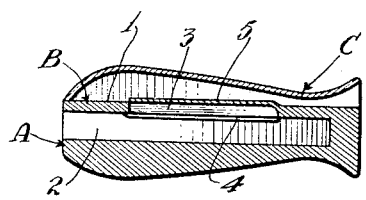
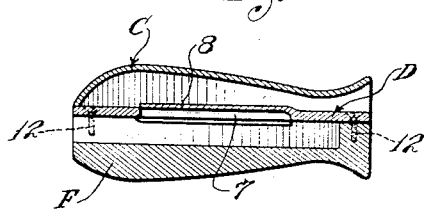
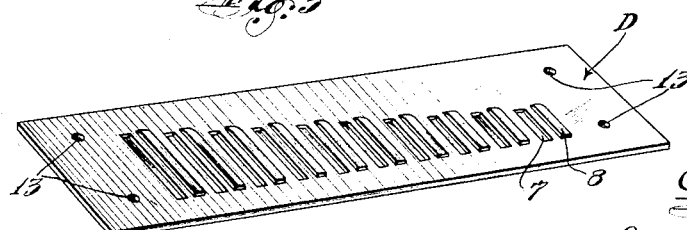
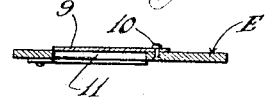
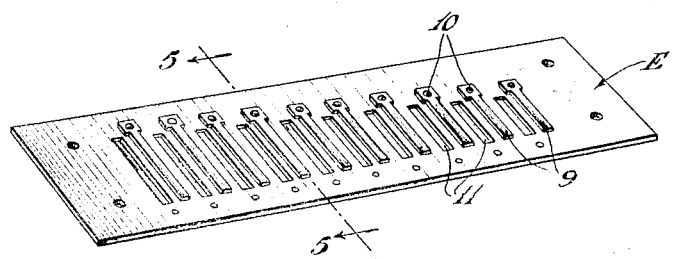
INVENTOR
Finn H. Magnus,
BY
Henry B. Cook,
ATTORNEY Patented Apr. 10, 1945

2,373,129

UNITED STATES PATENT OFFICE 2,373,129

HARMONICA

Finn H. Magnus, West Caldwell, N. J.

Application December 3, 1942, Serial No. 467,679

8 Claims. (Cl. 84—377)

This invention relates in general to harmonicas and more particularly to the construction of the reed plate and reeds for instruments of the harmonica type.

Heretofore it has been the common practice to form both the reed plate and the reeds of metal such as brass. The reed plate has been provided with slots and each reed has been riveted at one end to the reed plate in overlying relation to one of said slots. Harmonicas so constructed are expensive both as to material and fabrication and assembly of the parts, and the sound produced is deleteriously affected by the metallic resonance. Moreover, at the present time, due to war-time restrictions on the use of metals for civilian use, it is practically impossible to obtain suitable metals for the manufacture of harmonicas.

One object of my invention is to provide a novel and improved harmonica which shall have a reed plate or reeds, or both reed plate and reeds, formed of a plastic composition such as "Polystyrene," whereby the necessity for metal shall be overcome, the instrument shall have excellent tonal qualities, and the cost of manufacture shall not exceed that of known harmonicas.

Harmonicas which have metallic reed plates and reeds are also difficult to maintain in sanitary condition, because the metal corrodes; and the reeds sometimes become loosened. Either such corrosion or a loosened reed will spoil the harmonica.

Moreover, in known harmonicas wherein the reed plate is formed separately from and secured to the casing, leakage of air sometimes occurs through the cracks between the plate and the body, which makes playing of the instrument more difficult and impairs the tonal qualities of the instrument.

Therefore further objects are to provide a harmonica which shall have a novel and improved integral construction and combination of a wind cell block or casing and a reed plate to eliminate the step of assembling the reed plate and body and to prevent leakage of air therebetween; and to provide such a combination wherein the cell block and reed plate shall be formed of a single piece of non-corrosive plastic material so that the instrument can be maintained easily in sanitary condition.

Other objects are to provide a novel and improved integral combination of a reed plate and reeds; and to obtain other advantages and results as will be brought out by the following description in conjunction with the accompanying drawing in which Figure 1 is a perspective view of the harmonica embodying my invention, showing portions broken away for clearness in illustration.

Figure 2 is a transverse vertical sectional view on the line 2—2 of Figure 1.

Figure 3 is a perspective view of a reed plate and integral reeds embodying my invention.

Figure 4 is a perspective view of a modification of the invention which comprises a metallic reed plate having reeds of plastic composition.

Figure 5 is a transverse vertical sectional view on the line 5—5 of Figure 4, and Figure 6 is a transverse vertical sectional view through a harmonica embodying a reed plate like that of Figure 3.

For the purpose of illustrating the principles of my invention, I have shown it in connection with a generally known simple type of harmonica which includes a body or casing section with which is associated a reed plate having reeds secured thereto. In accordance with the invention as shown in Figures 1 and 2, the body or casing section A is formed integrally with the reed plate, or in other words, the body section includes an integral portion B which serves as a reed plate. The harmonica also includes a second casing section C which overlies the reed plate and forms a sound chamber for the reeds.

More specifically the body or casing section A comprises a block of plastic material, for example "Polystyrene" which may be molded in any suitable manner. The top surface 1 of the block is flat and the block has a plurality of recesses 2 opening at one end through one edge of the block and closed at the other end. The block also has a plurality of slots 3 opening through the top surface thereof and communicating with the recesses 2. In the present instance there are two slots 3 communicating with each recess, one slot for each of a pair of reeds. Each pair of reeds comprises a blow or exhale reed 4 and a draw or inhale reed 5 and, i. e., its heel end, each reed is connected at one end to one end of its corresponding slot while its other or toe end is free to vibrate.

As shown in Figures 1 and 2, each reed is integrally connected at one end to the body or casing section A and the other portions of the reed overlie the corresponding reed slot in spaced relation to the edges thereof.

The edge of the body or casing section through which the recesses 2 open constitutes the mouth piece of the instrument and the recesses 2 constitute wind cells for the reeds so that when the breath of the player is forced into a recess the blow reed 4 will be vibrated, while when air is drawn or sucked from the recess the corresponding draw reed 5 will be vibrated.

As is usual in instruments of this type, a common sound chamber for all of the reeds is provided, more generally by a cover or casing section such as that designated C which is secured to the body section A by rivets or other suitable fasteners 6.

While Figure 2 shows the body section integrally connected to the reed plate or in other words, the reed plate constituting a portion of the body section, if desired the reed plate may be made separately from the body section. As shown in Figure 3 the reed plate D may constitute a sheet of plastic material such as "Polystyrene," which has reed slots 7 and a reed 8 for each reed slot, each reed being integrally connected at one end to the plate D at one end of the corresponding reed slot. As shown, each reed has its heel end integrally connected to one side of the reed plate from a point at one end of the corresponding reed slot and intermediate the sides of the plate to a point beyond said slot end, and a portion of each reed intermediate its ends is located above the corresponding side of the reed plate. Also, the lower surface of each reed gradually merges into the end wall of the slot through a concave curve, while the upper surface of the reed gradually merges into the corresponding side of the reed plate through a convex curve, and the heel end of the reed gradually increases in thickness at its juncture with the reed plate.

It will also be understood that the reed plate and reeds might be formed of other suitable material if desired.

It is also possible to make the reed plate of one material and the reeds of another as shown in Figure 4 where the reed plate E may be formed of, for example, metal and the reeds 9 may be formed of a plastic composition such as "Polystyrene." As suggested by this figure it is also possible to make the reeds separate from the reed plate and secure them to the plate as by rivets 10 in the usual manner with each reed overlying the corresponding reed slot 11 in the reed plate E.

Figure 6 shows a harmonica having a separate reed plate, specifically the reed plate shown in Figure 3. The structure is the same as that shown in Figure 2, with the exception that the reed plate is separate from and secured to the body section F of the harmonica as by screws 12 which pass through openings 13 of the reed plate instead of being formed integrally with the body section. It will of course be understood by those skilled in the art that the same fasteners may be utilized for securing both the reed plate and the casing section or sound chamber plate to the body section F of the harmonica.

It will thus be seen that the invention provides a simple and relatively inexpensive harmonica, which, if desired, may be devoid of metal; and such an instrument can be kept easily in sanitary condition and will be non-corrosive. Moreover, where the reed plate forms a part of the casing of the instrument, all possibility of leakage of air between the reed plate and the casing is eliminated. The instrument having the parts formed of plastic material as described possesses excellent tonal qualities and the plastic reeds are less susceptible than metal to breakage as the result of flexing.

Other modifications and changes in the construction of the harmonica will occur to those skilled in the art as within the spirit and scope of the invention.

Furthermore, it will be evident that the invention can be embodied in other multiple reed instruments such as accordions, and the appended claims should be so interpreted.

What I claim is:

1. For a musical instrument, a reed plate formed of a plastic composition and having a reed slot, and a reed having its heel end integrally connected to one side of said reed plate from a point at one end of said slot to a point beyond said slot end.

2. For a musical instrument, a reed plate formed of a plastic composition and having a reed slot, and a reed having its heel end integrally connected to one side of said reed plate from a point at one end of said slot and intermediate the sides of said plate to a point beyond said slot end.

3. For a musical instrument, a reed plate formed of a plastic composition and having a reed slot, and a reed having its heel end integrally connected to one side of said reed plate from a point at one end of said slot to a point beyond said slot end, a portion of said reed intermediate its ends being located above said side of said plate.

4. For a musical instrument, a reed plate formed of a plastic composition and having a reed slot, and a reed having its heel end integrally connected to one side of said reed plate from a point at one end of said slot to a point beyond said slot end, said heel end of said reed gradually increasing in thickness at its juncture with said reed plate.

5. For a musical instrument, a reed plate formed of a plastic composition and having a reed slot, and a reed having its heel end integrally connected to one side of said reed plate from a point at one end of said slot to a point beyond said slot end, the lower surface of said reed gradually merging through a concave curve into the wall at said end of said slot.

6. For a musical instrument, a reed plate formed of a plastic composition and having a reed slot, and a reed having its heel end integrally connected to one side of said reed plate from a point at one end of said slot to a point beyond said slot end, the lower and upper surfaces of said reed gradually merging into the wall at said end of said slot and into said side of the reed plate through a concave curve and through a convex curve, respectively.

7. For a musical instrument, a reed plate formed of polystyrene and having a reed slot, and a reed having its heel end integrally connected to one side of said reed plate from a point at one end of said slot to a point beyond said slot end.

8. A harmonica comprising a body formed of plastic material, a reed plate molded of plastic material and having reed slots and a reed overlying each slot and integrally connected at its heel end to one side of said reed plate from a point at one end of said reed slot to a point beyond said slot end, there being wind passages in said body for conducting air currents through said slots past said reeds.

FINN H. MAGNUS.